(12) United States Patent
Gross et al.

(10) Patent No.: US 9,929,922 B2
(45) Date of Patent: Mar. 27, 2018

(54) SAMPLING-DENSIFICATION TECHNIQUE TO FACILITATE HIGH-SAMPLING-DENSITY SIGNATURES FOR TELEMETRY DATA IN ENTERPRISE COMPUTING SYSTEMS

(71) Applicant: Oracle International Corporation, Redwood Shores, CA (US)

(72) Inventors: Kenny C. Gross, Escondido, CA (US); Kalyanaraman Vaidyanathan, San Diego, CA (US); Dustin R. Garvey, Oakland, CA (US); Lik Wong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 109 days.

(21) Appl. No.: 15/180,812

(22) Filed: Jun. 13, 2016

(65) Prior Publication Data
US 2017/0359234 A1 Dec. 14, 2017

(51) Int. Cl.
*G06F 11/30* (2006.01)
*H04L 12/26* (2006.01)
*G06F 11/07* (2006.01)

(52) U.S. Cl.
CPC .......... *H04L 43/04* (2013.01); *G06F 11/0709* (2013.01); *G06F 11/079* (2013.01); *G06F 11/0751* (2013.01); *H04L 43/50* (2013.01)

(58) Field of Classification Search
CPC ............. G06F 11/3414; G06F 11/3466; G06F 11/3476
USPC ...................................................... 714/37, 45
See application file for complete search history.

(56) References Cited

U.S. PATENT DOCUMENTS

| | | | |
|---|---|---|---|
| 6,760,903 B1* | 7/2004 | Morshed | G06F 11/3466 717/130 |
| 2003/0110421 A1* | 6/2003 | Kurinami | G06F 11/3428 714/47.1 |
| 2008/0137722 A1* | 6/2008 | Cherubini | G11B 20/10009 375/232 |
| 2008/0307391 A1* | 12/2008 | Goel | G06F 11/3676 717/115 |
| 2009/0182868 A1* | 7/2009 | McFate | G06F 9/5027 709/224 |

(Continued)

*Primary Examiner* — Chae Ko
(74) *Attorney, Agent, or Firm* — Park, Vaughan, Fleming & Dowler LLP

(57) ABSTRACT

The disclosed embodiments relate to a system that gathers telemetry data while testing a computer system. During operation, the system obtains a test script that generates a load profile to exercise the computer system, wherein a running time of the test script is designed to be relatively prime in comparison to a sampling interval for telemetry data in the computer system. Next, the system gathers telemetry data during multiple successive executions of the test script on the computer system. The system merges the telemetry data gathered during the multiple successive executions of the test script, wherein the relatively prime relationship between the running time of the test script and the sampling interval for the telemetry data causes a sampling point for the telemetry data to precess through different points in the test script during the multiple successive executions of the test script, thereby densifying sampled telemetry data points gathered for the test script. Finally, the system outputs the densified telemetry data.

20 Claims, 10 Drawing Sheets

(56) References Cited

U.S. PATENT DOCUMENTS

2012/0066357 A1* 3/2012 McFate .................. G06F 9/5027
709/221
2015/0278076 A1* 10/2015 BS ...................... G06F 11/3684
714/38.1

* cited by examiner

US 9,929,922 B2

SAMPLING-DENSIFICATION TECHNIQUE TO FACILITATE HIGH-SAMPLING-DENSITY SIGNATURES FOR TELEMETRY DATA IN ENTERPRISE COMPUTING SYSTEMS

BACKGROUND

Field

The disclosed embodiments generally relate to techniques for sampling and analyzing telemetry data obtained from sensors in an enterprise computing system. More specifically, the disclosed embodiments relate to a sampling-densification technique that facilitates generating high-sampling-density signatures for telemetry data obtained from sensors in enterprise computing systems.

Related Art

Enterprise computing systems often monitor telemetry data obtained from internal physical sensors and software resources to diagnose operational issues that might arise and, if necessary, to issue warnings of impending problems. Unfortunately, commonly used threshold-based warnings and diagnostics are "reactive" in nature; by the time a threshold limit has been exceeded, the problem is already severely affecting system performance (or the system has crashed). Because of the business-critical nature of enterprise and cloud computing systems, this endemic limitation of threshold-based diagnostics has motivated the development of predictive analytic techniques to proactively alert system operators of incipient anomalies, hopefully with enough lead time so that problems can be avoided or proactively fixed.

However, the effectiveness of predictive-analytics techniques is highly dependent on the obtainable sampling rates for the monitored metrics. This is a problem because the maximum achievable telemetry sampling rates in enterprise computing systems are severely constrained by standards that have evolved over the past two decades and will be very difficult to change. In almost all cases, telemetry sampling rates are hard-coded into the low-level hardware registers and system firmware. In other cases, administrators are not allowed to increase these sampling rates because system-bus bandwidths and I/O bandwidths would become saturated if the sampling rates were increased.

Hence, what is needed is a method and an apparatus that facilitates extracting high-sampling-rate signatures for telemetry data without having to make hardware modifications to enterprise computing systems.

SUMMARY

The disclosed embodiments relate to a system that gathers telemetry data while testing a computer system. During operation, the system obtains a test script that generates a load profile to exercise the computer system, wherein a running time of the test script is designed to be relatively prime in comparison to a sampling interval for telemetry data in the computer system. Next, the system gathers telemetry data during multiple successive executions of the test script on the computer system. The system merges the telemetry data gathered during the multiple successive executions of the test script, wherein the relatively prime relationship between the running time of the test script and the sampling interval for the telemetry data causes a sampling point for the telemetry data to precess through different points in the test script during the multiple successive executions of the test script, thereby densifying sampled telemetry data points gathered for the test script. Finally, the system outputs the densified telemetry data.

In some embodiments, while merging the telemetry data gathered during the multiple successive executions of the test script, the system selects telemetry data gathered during a first execution of the test script to be a reference profile. Then, for data gathered during each successive execution of the test script, the system slides data points for the successive execution forward and/or backward in time to optimize a fit with the reference profile, and after optimizing the fit, merges the data points for the successive execution into the reference profile.

In some embodiments, after the data gathered during the multiple executions of the test script has been merged into the reference profile, the system performs a remerging operation that makes a second pass through the telemetry data gathered during each execution of the test script. During this remerging operation, for each execution of the test script, the system: (1) removes the data gathered during the execution from the reference profile; (2) re-optimizes the fit for the data gathered during the execution with the reference profile; and (3) remerges the data gathered during the execution back into the reference profile.

In some embodiments, after performing the remerging operation, the system performs a timestamp conversion operation, wherein for each execution of the test script, the system converts timestamps for data points in the reference profile, which were obtained from the execution of the test script, into timestamps relative to a beginning of the execution of the test script.

In some embodiments, after converting the timestamps, the system performs a moving-window ensemble average operation for each parameter in the telemetry data over the reference profile.

In some embodiments, after performing the moving-window ensemble average operation, the system performs an iterative upsampling operation across data points in the reference profile to make time intervals between the data points uniform.

In some embodiments, the telemetry data includes: (1) data gathered from physical sensors in the computer system that monitor physical performance parameters, including one or more of temperature, voltage, current, vibration, and acoustic parameters; and (2) software-related telemetry parameters, including one or more of processor load, memory usage, cache usage, system throughput, queue lengths, I/O traffic, and quality of service (QOS).

In some embodiments, outputting the densified telemetry data comprises outputting the densified telemetry data to a predictive analytic system that is designed to detect incipient anomalies in performance of the computer system.

DETAILED DESCRIPTION

Figure 1:
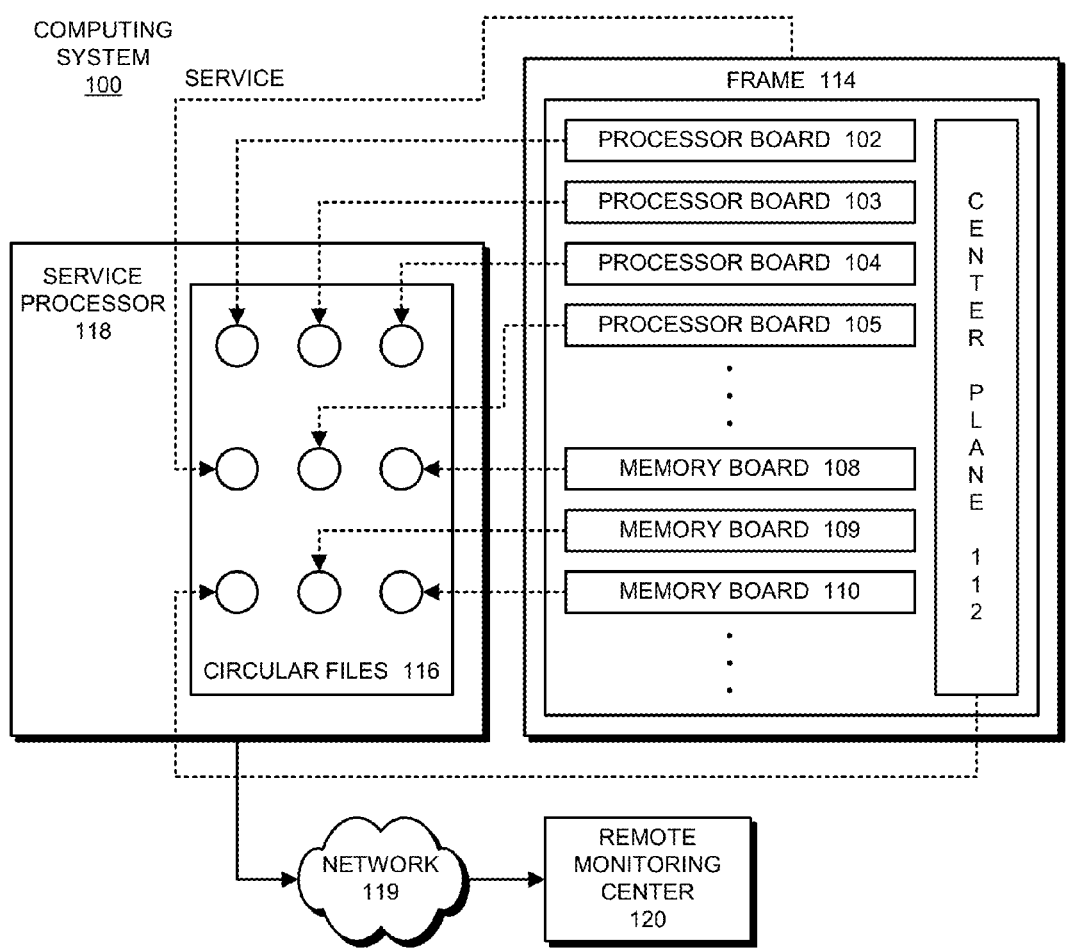
FIG. 1 illustrates a computer system that includes a service processor for processing telemetry signals in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Limited Sampling Rates

For enterprise computer servers the maximum achievable telemetry sampling rates are presently constrained by standards that have evolved over the last two decades and will be very difficult to change. In a typical enterprise server system, sampling rates are constrained by a number of factors, including the firmware that runs on the system's service processor (SP), by the Intelligent Platform Management Interface (IPMI) that communicates data for system monitoring functions, and by the Inter-Integrated Circuit ($I^2C$) system bus. For example, in some current-generation server systems, the fastest possible sampling rate for physical telemetry readings with prognostic significance (e.g., temperatures, voltages, currents, power levels, fan speeds) is greater than 10 seconds for some systems, and as slow as once per minute on large servers containing hundreds or thousands of physical sensors. As the number of sensors continues to increase with time, the attainable sampling rates will continue to decrease, thanks to the slow pace of improvements in sensor-related bandwidth.

Similarly, the existing sampling rates achievable for "soft" telemetry metrics, which have prognostic relevance for quality of service (QoS) assurance and for prognostic cybersecurity applications, can be as long as 10 minutes for many important metrics, such as loads, utilizations, throughput metrics, queue lengths, transaction latencies, etc. These sampling rates were adequate in the past when only crude performance diagnostic aids were provided with servers to indicate performance problems, such as thresholds to alert system administrators or service engineers about exhaustion-of-resource problems.

Unfortunately, such threshold-based warnings and diagnostics are "reactive" in nature; by the time a threshold limit has been exceeded, the problem is already severe (or the system is crashed). Because of the increasingly business-critical nature of enterprise and cloud computing, this endemic limitation of threshold-based diagnostics has motivated development of predictive analytic (PA) systems, to proactively alert system administrators and security personnel of incipient anomalies, hopefully with enough lead time so that issues can be avoided or proactively fixed, hopefully well before end customers become aware of QoS issues or other customer dissatisfiers, and at the earliest possible time for proactive "indicators of compromise" (IOCs) for cybersecurity applications in business-critical systems.

Slow telemetry sampling rates pose an even greater problem for PA systems that use prognostic analysis techniques than for crude threshold-based prognostics. For example, if an important class of QoS telemetry metrics can only be sampled at a rate of once every 10 minutes, this means an alert for a QoS problem can appear as long as 10 minutes later than the system began experiencing problems. Although alerts for threshold-based diagnostics are of only limited usefulness for avoiding customer dissatisfiers because threshold-based diagnostics are reactive in nature, getting the alert 10 minutes earlier is only marginally more useful than 10 minutes later, because the system is likely already in serious trouble when a threshold is tripped. In other words, these slow sampling rates do not make threshold-based diagnostics much worse.

In contrast, PA techniques have the potential to proactively alert system administrators and service engineers hours and sometimes days in advance for slow degradation mechanisms. However, the effectiveness of PA techniques (in terms of minimizing false-alarm and missed-alarm probabilities, FAPs and MAPs) is dependent upon sampling rates for the monitored metrics.

If a PA-monitoring technique with a high sampling rate is used for all monitored performance metrics in a system, this PA-monitoring technique will perform significantly better than if the same PA-monitoring technique were used for an identical system configuration with a much slower sampling rate. Similarly, if a PA-monitoring mechanism is trained with high-sampling-rate telemetry metrics, and then the same trained PA-monitoring mechanism is used to monitor the identical system but with a slower sampling rate in a real data center, the PA-monitoring mechanism will perform better because it was trained on high-sampling-rate telemetry data, versus if the identical PA-monitoring mechanism had been trained on slow-sampling-rate telemetry data. The reason for improved prognostic performance with higher-sampling-rate telemetry data is that PA-monitoring techniques, especially those that make use of so-called nonlinear, nonparametric (NLNP) regression techniques, can better "learn" the patterns of dynamical correlation between/among all the monitored metrics.

Because PA-monitoring techniques perform better if trained on high-sampling-rate telemetry data, even when the trained PA-monitoring mechanisms are used to monitor enterprise servers with slower sampling rates, it is advantageous to "crank up" the sampling rate to arbitrarily high values to train the PA-monitoring mechanism.

Unfortunately, for almost all existing enterprise servers, it is either impossible or impractical to "crank up" the sampling rates for internal telemetry time series metrics for the purposes of obtaining better training data sets. In almost all cases, the sampling rates are hard-coded into the low-level hardware registers and system firmware. In other cases, no rate-control "knobs" are provided because system-bus bandwidths and I/O bandwidths would become saturated if sampling rates were "turned up."

In the future, industry standards may evolve to allow much higher sampling rates for telemetry variables. However, this will be a slow process. Moreover, it will be impossible to retrofit existing legacy systems with new internal system bus architectures.

Why Sampling Density is Important

If idealized computing systems existed, wherein all the interactions between/among the myriad telemetry signatures were linear, then sampling density would not be a big problem (in fact, we could slow down the telemetry sampling and enjoy a reduction in compute cost for prognostics). However, in today's enterprise computing servers there exist highly nonlinear relationships among the telemetry metrics.

For example, prior to about five years ago, central processing unit (CPU) chips dissipated heat in direct proportion to the "switching activity" going on inside the CPU chips. Now that CPU feature widths are so small, there is significant "leakage power" inside the CPU chip; this leakage power is exponentially dependent upon CPU temperature. So there presently exist very complex nonlinear relationships among physical system parameters, such as current, voltage, CPU frequency, compute load, fan speed (which affects CPU temperature and hence leakage power), external ambient temperature, and even altitude (because air at sea level has significantly greater cooling capability than thinner air, for example, in Denver). In turn, these nonlinear relationships for physical system parameters are correlated with the various load and throughput "soft" telemetry metrics.

Similarly, QoS telemetry metrics have reasonably linear interrelationships when there exists a lot of free memory in computer systems. However, when memory-intensive applications start to get close to the limit of available free memory, applications start swapping to slower storage, and this introduces highly nonlinear relationships among "soft" telemetry parameters.

In another example, when I/O pathways are free from congestion inside a server, and at associated interfaces between IT systems and external networks, there exist well-behaved linear relationships between flow-related telemetry parameters and inter-arrival times for packets (IAT signatures). However, as available bandwidth channels become saturated, a complex nonlinear relationship develops between flow-related metrics and latency (or IAT) metrics.

Because of these complex nonlinear relationships among the thousands of telemetry parameters monitored by advanced prognostic techniques, we need the highest possible sampling density so that the pattern-recognition techniques can robustly and accurately "learn" the patterns of interactions across thousands of monitored metrics. Also note that because of these nonlinearities, simple interpolation techniques will not be effective in "filling in the blind spots."

Densification

The disclosed embodiments provide a novel technique that facilitates "telemetric sampling densification" to provide very accurate monitoring of fine-grained behavioral dynamics for standard enterprise computing servers, even when the servers are constrained to slow sampling rates by industry-standard I$^2$C, IPMI, or ILOM architectures.

This new technique for boosting telemetry sampling rates is empirically based and is preferable for prognostic monitoring and cybersecurity applications for which "reference testbed configurations" can be set up in a laboratory. The technique even works in systems for which faster telemetry sampling rates are physically/electronically impossible, and even when all available bandwidth pathways are near saturation and bandwidth cannot be increased.

This breakthrough is achieved with no hardware modifications in any of the IT systems, storage, engineered systems, or networks, and hence is backward compatible with hundreds of thousands of legacy enterprise computer systems in the field.

We begin by generating a test script that generates a reproducible deterministic dynamic load profile, which exercises the CPU, memory, and I/O systems through as wide a range as possible. Note that exercising compute, memory, and I/O dynamics through as wide a range as possible is not a requirement nor an enabler for this technique. This technique will work equally well, even for lightly loaded system testbed configurations. Instead, the desire to exercise test systems through the widest range possible yields the most robust PA performance for prognostics. We ideally stress test systems dynamically between the maximum possible range, from completely idle, to totally maxed out on CPU, memory utilization, and saturated I/O channels, with lots of dynamic variations between those minimum and maximum ranges, to do the best job characterizing patterns among all classes of monitored telemetry signals.

For this technique, we establish a fixed time window W during which the dynamic exerciser test scripts will generate a deterministic (and hence exactly replicable) load profile that exhibits rich dynamics in CPU utilization, memory utilization, and I/O metrics. Moreover, it is desirable to set the width of W to a prime number of time intervals (for example, 631 seconds).

Note that the telemetry sampling rates that are hard-coded into computer systems and networks are almost always set to a fixed number of time units with a uniform sampling rate, such as once every 30 seconds or 60 seconds. If so, and if the window width W is an integer multiple of the sampling rate (e.g., exactly 10 minutes), then the samples will unintentionally overlay one another. Hence, by picking a window width W that is a prime number of seconds, we minimize the likelihood that, when we run a reasonable number of experimental replications (say, several dozen replications), any samples will accidentally overlay one another. Note that if the sampling rate for the telemetry data is not fixed, but can be independently specified, then we can set the window width W to be one prime number (e.g., 631 seconds), and the sampling interval $I_S$ to be a second but different prime number (e.g., 79 seconds). In this case, the samples will not accidentally overlay one another until 79*631 seconds or about 14 hours, which is far longer than needed for the densification technique to work effectively.

For the densification technique to work effectively, the telemetry sampling interval $I_S$ and the window width W do not necessarily have to be prime numbers. This technique will work equally well in any scenario where $I_S$ and W are "relatively prime" with respect to each other. This relatively prime relationship ensures that a sampling point for the telemetry data will precess through different points in the test script during the multiple successive executions of the test script. For example, if $I_S$ is 16 seconds and W is 81 seconds, the technique will work equally well because 16 is relatively prime to 81, even though neither 16 nor 81 is a prime number.

For testing purposes, we generate numerous replications of the deterministic load profile that are long enough to span a maximal range in CPU, memory, and I/O "stress" levels and that span a prime number of seconds. Note that that ten successive window replications is likely to be sufficient, but the more dynamic profile replications one generates, the higher the resolution will be for the densified telemetry signature characterizations.

Assuming that N replicated profile windows are generated, we now analytically "cut up" the time series into N "chunks," each of which is slightly longer than the window-width time W. Note that extra time is needed at the beginning and end of each chunk for a "coherence optimization" step, wherein each chunk gets analytically slid forward and backward to optimize its coherence with respect to an iteratively defined "reference curve," as described below. This reference curve starts out with very poor resolution and coarse granularity. However, with each successive iteration, the reference curve attains increasingly higher resolution and increasingly finer grained definition. We refer to this iterative process as "telemetry sample empirical densification."

This technique is fundamentally different than numerical interpolation. Numerical interpolation is an analytical technique that "fills in" samples between measured observations. No matter how sophisticated nor how "intelligent" the interpolation technique is, the "blind spot" between measured observations is not made any more accurate by filling in values that have no foundation in measurements. In contrast, sampling densification is an empirical (versus analytical) technique, which is based on real measurements and generates a highly accurate fine-grained time series with an arbitrarily dense sampling rate, even for systems in which a high sampling rate is physically/electronically impossible.

Computer System

We now describe an exemplary implementation of the disclosed embodiments. Note that the disclosed embodiments provide a method and system for analyzing telemetry data from a computer system. The telemetry data may be obtained from an operating system of the computer system, a set of sensors in the computer system, and/or one or more external sensors that reside outside the computer system. As shown in FIG. 1, a computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, and/or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Alternatively, a single comprehensive circular file may be created and used to aggregate performance data for all FRUs within computer system 100.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computer system 100, as described below with respect to FIG. 2. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
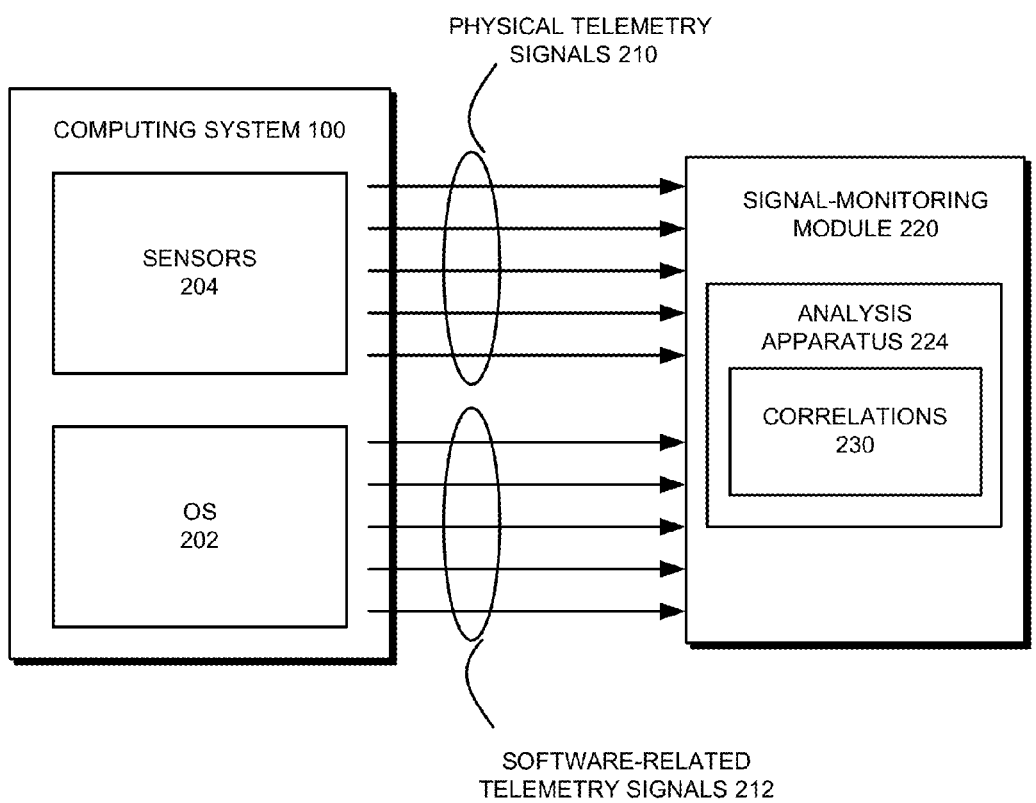
FIG. 2 illustrates a telemetry analysis system in accordance with the disclosed embodiments.

FIG. 2 shows a telemetry analysis system in accordance with an embodiment. In this example, the computing system 100 is monitored using a number of telemetric signals, including physical telemetry signals 210 and software-related telemetry signals 212, which are transmitted to a signal-monitoring module 220. Signal-monitoring module 220 may assess the state of computer system 200 using these telemetry signals 210 and 212. For example, signal-monitoring module 220 may analyze telemetry signals 210 and 212 to detect and manage faults in computer system 200 and/or issue alerts when there is an anomaly or degradation risk in computer system 200.

Signal-monitoring module 220 may be provided by and/or implemented using a service processor associated with computer system 200. Alternatively, signal-monitoring module 220 may reside within a remote monitoring center (e.g., remote monitoring center 120 of FIG. 1) that obtains telemetry signals 210 from computer system 200 over a network connection. Moreover, signal-monitoring module 220 may include functionality to analyze both real-time telemetry signals 210 and 212 and long-term historical telemetry data. For example, signal-monitoring module 220 may be used to detect anomalies in telemetry signals 210 and 212 received directly from the monitored computer system(s). Signal-monitoring module 220 may also be used in offline detection of anomalies from the monitored computer system(s) by processing archived and/or compressed telemetry data associated with the monitored computer system(s).

Prior to analyzing telemetry signals 210 and 212, analysis apparatus 224 may aggregate and pre-process telemetry signals 210 and 212. Moreover, during pre-processing of telemetry signals 210 and 212, analysis apparatus 224 may synchronize disparate sampling streams by standardizing timestamps of telemetry signals 210 and 212 from different domains. Next, analysis apparatus 224 may transform telemetry signals 210 and 212 into signals with uniform sampling rates. For example, analysis apparatus 224 may use an analytical re-sampling process (ARP) to up-sample signals with slower sampling rates to match the highest sampling rates in the aggregation of monitored telemetry signals 210 and 212.

In one or more embodiments, the nonlinear, nonparametric regression technique used by analysis apparatus 224 corresponds to a Multivariate State Estimation Technique (MSET). Analysis apparatus 224 may be trained using historical telemetry data from computer system 200 and/or similar computer systems. The historical telemetry data may be used to determine correlations 230 among various telemetry signals 210 and 212 collected from the monitored computer system(s).

Those skilled in the art will appreciate that the nonlinear, nonparametric regression technique used in analysis apparatus 224 may be provided by any number of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term "MSET" as used in this specification can refer to (among other things) any of the 25 techniques outlined in Gribok, including Ordinary Least Squares (OLS), Support Vector Machines (SVM), Artificial Neural Networks (ANNs), MSET, or Regularized MSET (RMSET).

Gathering and Processing Telemetry Data

Figure 3:
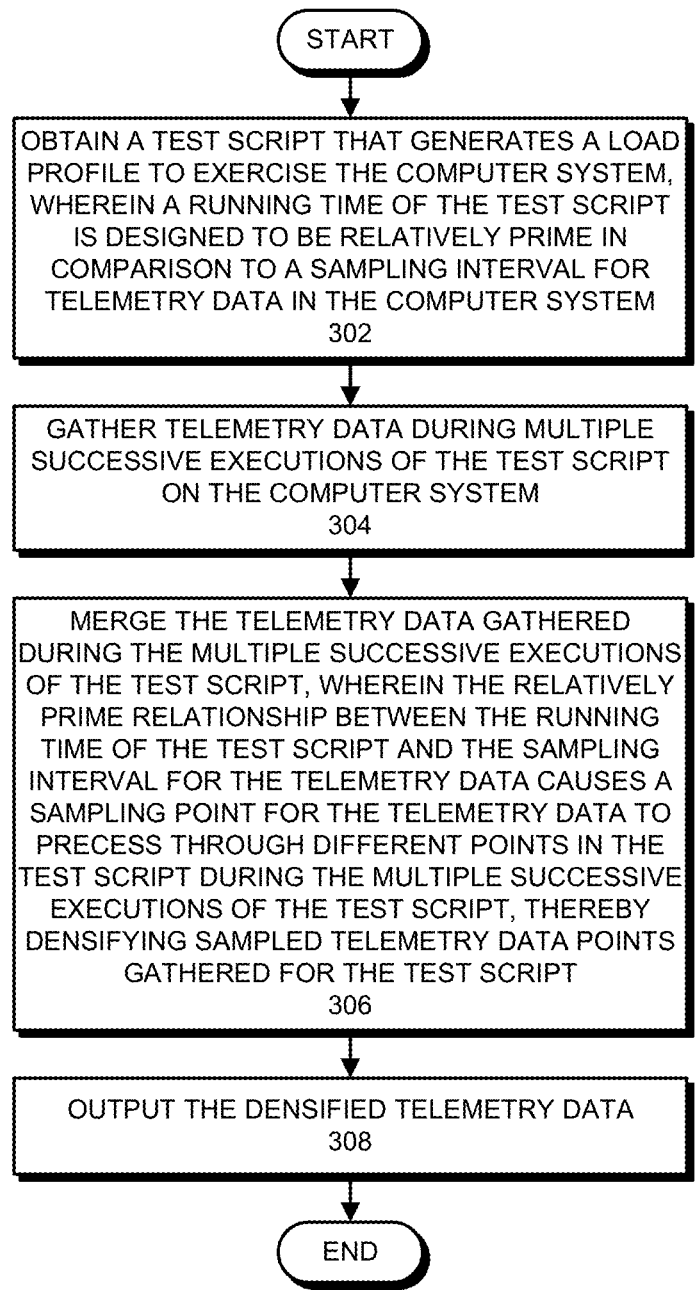
FIG. 3 presents a flowchart illustrating how a system gathers telemetry data while testing a computer system.

FIG. 3 presents a flowchart illustrating how a system gathers telemetry data while testing a computer system. During operation, the system obtains a test script that generates a load profile to exercise the computer system, wherein a running time of the test script is designed to be relatively prime in comparison to a sampling interval for telemetry data in the computer system (step 302). Note that it is desirable for this test script to exercise the computer system across a wide range of stress intensities, from completely idle to totally maxed out in CPU utilization, memory utilization, and I/O intensity. Next, the system gathers telemetry data during multiple successive executions of the test script on the computer system (step 304). During this process, the system merges the telemetry data gathered during the multiple successive executions of the test script, wherein the relatively prime relationship between the running time of the test script and the sampling interval for the telemetry data causes a sampling point for the telemetry data to precess through different points in the test script during the multiple successive executions of the test script, thereby densifying sampled telemetry data points gathered for the test script (step 306). Finally, the system outputs the densified telemetry data (step 308). For example, the system can output the densified telemetry data to a predictive analytic system that is designed to detect incipient anomalies in performance of the computer system.

Collecting Telemetry Data

Figure 4:
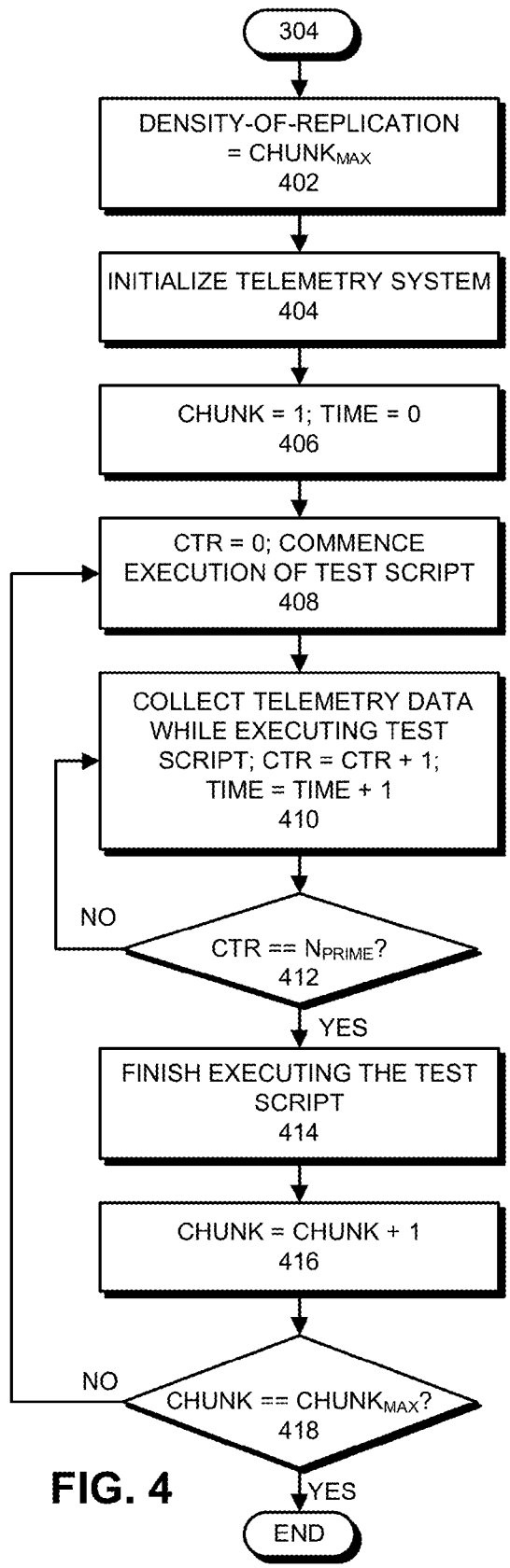
FIG. 4 presents a flowchart illustrating the process of collecting telemetry data in accordance with the disclosed embodiments.

FIG. 4 presents a flowchart illustrating the process of collecting telemetry data in accordance with the disclosed embodiments. (This flowchart illustrates in more detail the operations involved in step 304 in the flowchart that appears in FIG. 3 described above.) During this collection process, the telemetry data is collected in "chunks" associated with successive executions of the test script, wherein the chunks are merged to produce the densified telemetry data, as is described above with reference to step 306 in the flowchart in FIG. 3. The system also selects an execution time for the test script which is ideally a prime number $N_{PRIME}$.

First, the system sets a "density of replication" parameter to the value $CHUNK_{MAX}$ (step 402), which specifies the number of chunks to be processed. Next, the telemetry system is initialized (step 404). Then, a CHUNK variable is set to 1 and a TIME variable is set to zero (step 406). Next, a counter for the test script "CTR" is set to zero, and the system commences execution of the test script (step 408).

The system subsequently collects telemetry data while executing the test script, and also increments the CTR and TIME variables as time elapses (step 410). Next, the system compares CTR with $N_{PRIME}$ (step 412). If CTR is not equal to $N_{PRIME}$ yet, the system returns to step 410 to continue collecting telemetry data. Otherwise, if CTR==$N_{PRIME}$, the system finishes executing the test script (step 414) and increments the CHUNK variable (step 416). At this point, the system determines whether CHUNK equals $CHUNK_{MAX}$ (step 418). If so, the process is complete. Otherwise, the system returns to step 408 to commence a subsequent execution of the test script.

Figure 5:
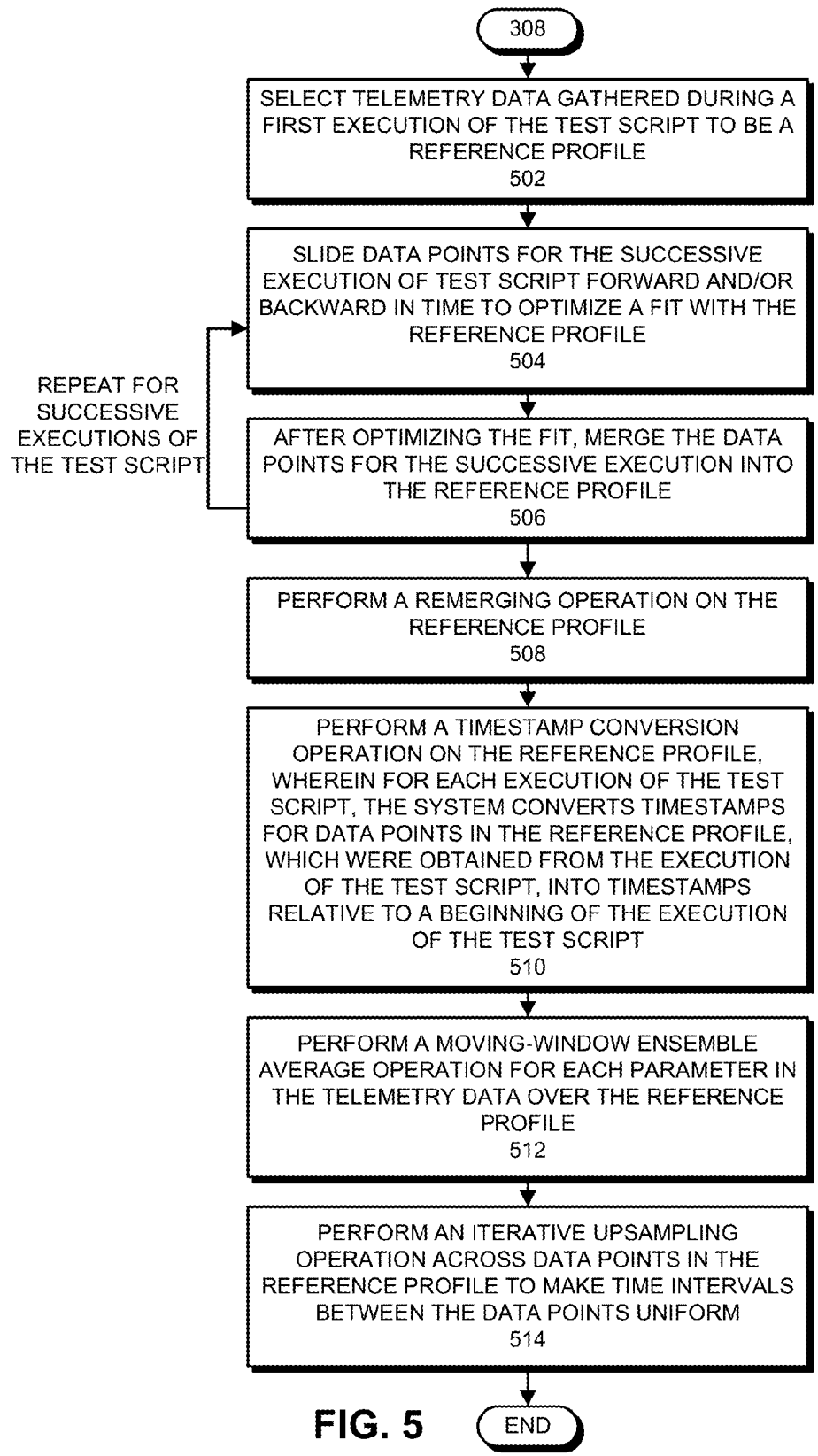
FIG. 5 presents a flowchart illustrating the process of densifying telemetry data in accordance with the disclosed embodiments.

FIG. 5 presents a flowchart illustrating the process of densifying telemetry data in accordance with the disclosed embodiments. (This flowchart illustrates in more detail the operations involved in step 308 in the flowchart that appears in FIG. 3 and is described above.) First, while merging the telemetry data gathered during the multiple successive executions of the test script, the system selects telemetry data gathered during a first execution of the test script to be a reference profile (step 502). Then, for data gathered during each successive execution of the test script, the system slides data points for the successive execution forward and/or backward in time to optimize a fit with the reference profile (step 504), and after optimizing the fit, the system merges the data points for the successive execution into the reference profile (step 506).

Figure 6:
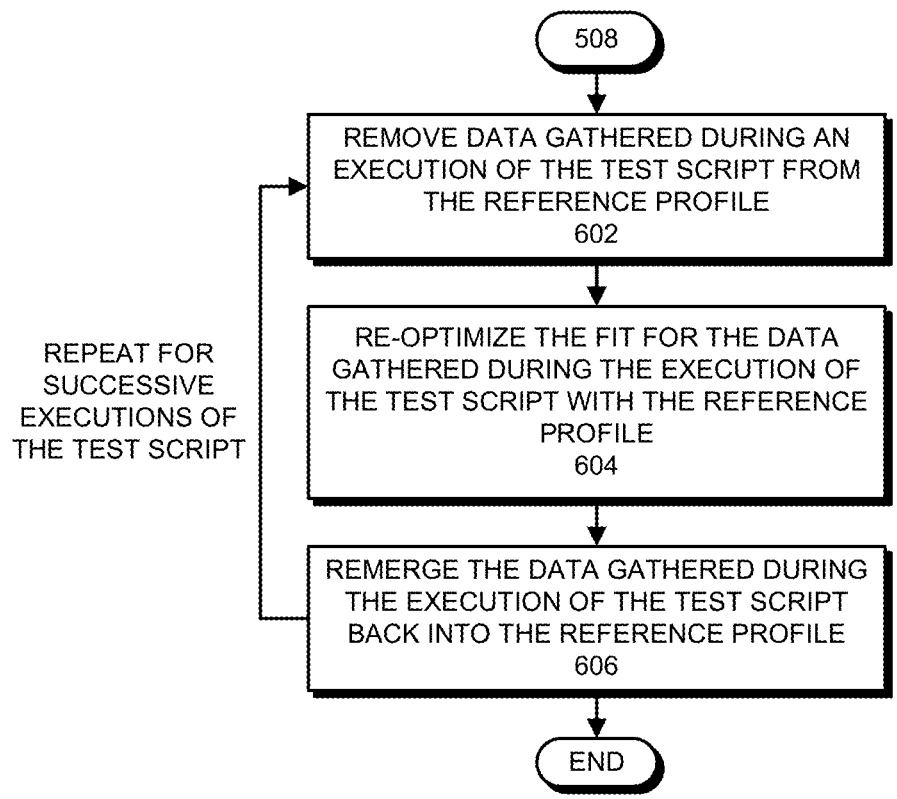
FIG. 6 presents a flowchart illustrating the process of remerging telemetry data in accordance with the disclosed embodiments.

The system then performs a "remerging operation" on the reference profile (step 508). This remerging operation is illustrated in more detail in the flowchart that appears in FIG. 6. During this remerging process, the system makes a second pass through the telemetry data gathered during each execution of the test script. For each execution of the test script, the system: removes the data gathered during the execution from the reference profile (step 602); re-optimizes the fit for the data gathered during the execution with the reference profile (step 604); and remerges the data gathered during the execution back into the reference profile (step 606). This remerging operation is performed to reduce the effects of any abnormalities or artifacts that may have been present in the earlier chunks during the first pass through the telemetry data.

Referring back to the FIG. 5, after performing the remerging operation, the system performs a timestamp conversion operation, wherein for each execution of the test script, the system converts timestamps for data points in the reference profile, which were obtained from the execution of the test script, into timestamps relative to a beginning of the execution of the test script (step 510).

Then, after converting the timestamps, the system performs a moving-window ensemble average operation (e.g., with a width of 20 samples) for each parameter in the telemetry data over the reference profile (step 512).

Finally, after performing the moving-window ensemble average operation, the system performs an iterative upsampling operation across data points in the reference profile to make time intervals between the data points uniform (step 514). Note that the moving-window ensemble average operation produces a densified sample, but the sampling intervals are not necessarily uniform. This upsampling operation maintains the accuracy of the reference profile, but transforms the sampling intervals to be exactly equal. (For example, the system can set the sampling intervals to exactly one time unit.) After this upsampling operation is complete, the densification process ends.

EXEMPLARY RESULTS

Figure 7:
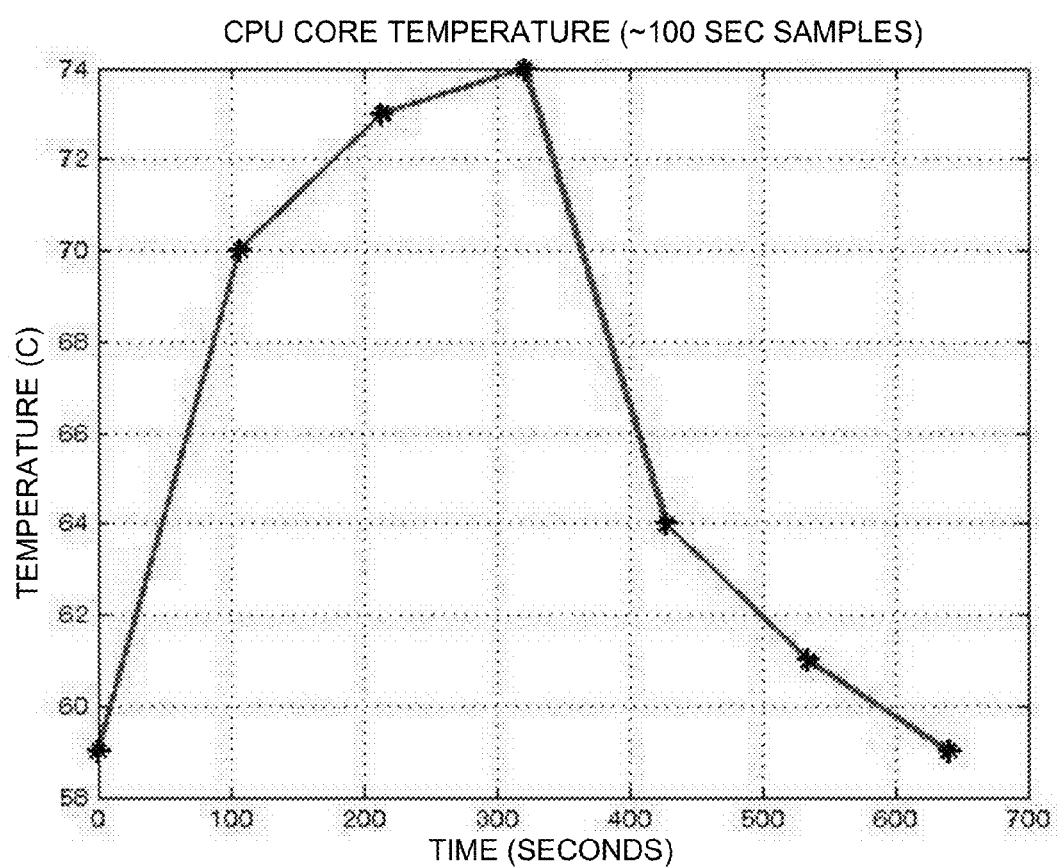
FIG. 7 illustrates exemplary telemetry data without densification in accordance with the disclosed embodiments.

FIG. 7 illustrates telemetry data without densification in accordance with the disclosed embodiments. During the telemetry period illustrated in FIG. 7, the CPUs and memory are hit with a sudden step change in load from idle to maximum. The chip thermal telemetry responds, going from a cool 59° C. up to a maximum of about 74° C. However, the sampling rate is far too coarse to enable accurate characterization of the rapid dynamics for training of advanced PA techniques, either for prognostic QoS anomaly detection or for prognostic security applications for the server.

Figure 8:
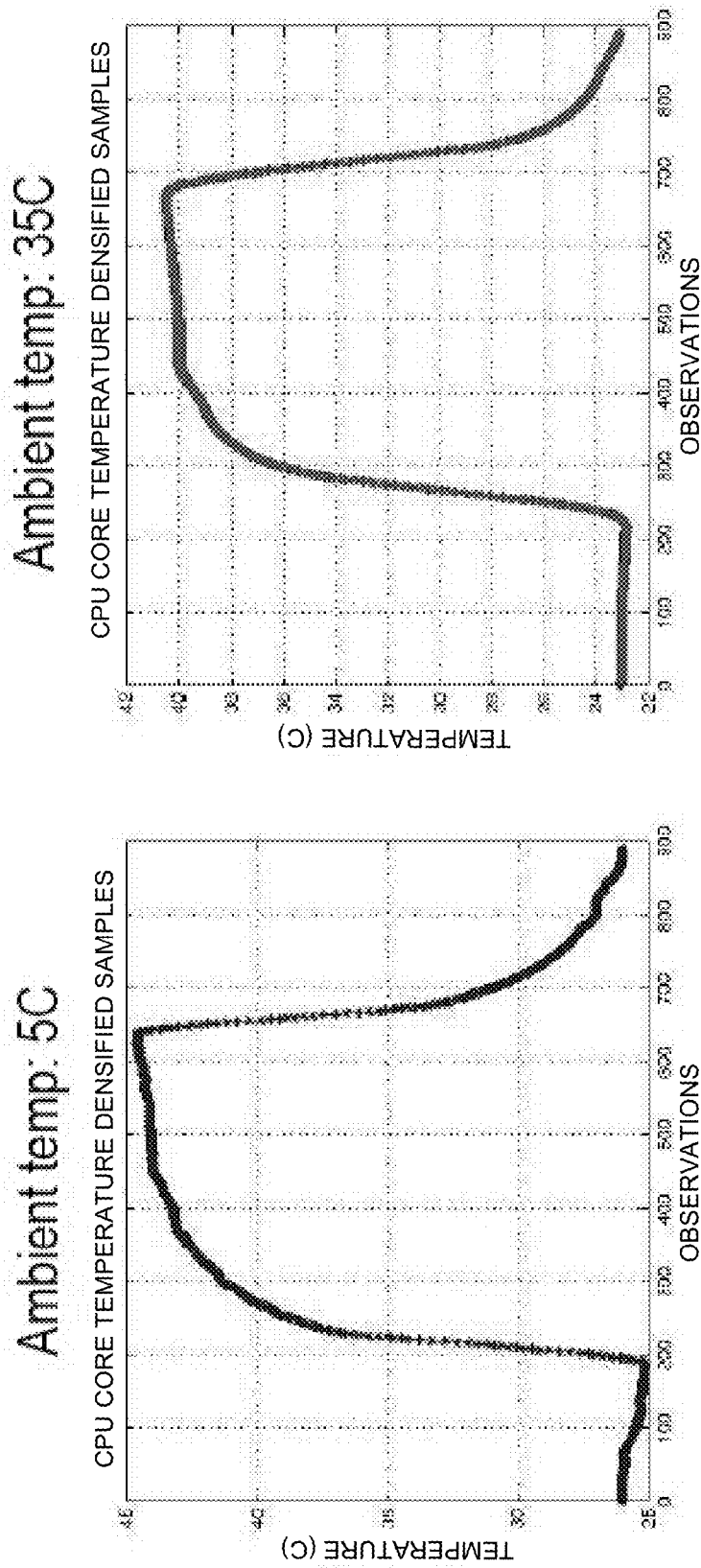
FIG. 8 illustrates exemplary densified telemetry data in accordance with the disclosed embodiments.

In contrast, FIG. 8 illustrates densified telemetry data produced for different ambient temperatures, 5° C. and 35° C., using the above-described densification procedure. This densification procedure produced a one-second sampling resolution from data, which because of industry standard conventions, had a minimum sampling interval of 50 seconds. Note that in comparison to the non-densified telemetry data illustrated in FIG. 7, the densified telemetry data illustrated in FIG. 8 provides much better resolution, which facilitates fine-granularity high-resolution telemetry data that can be used for training, tuning, and optimizing PA techniques. This densification procedure in effect attains arbitrarily high sampling rates, even for IT systems and networks for which it is physically and electronically impossible to increase the sampling rates.

Figure 9:
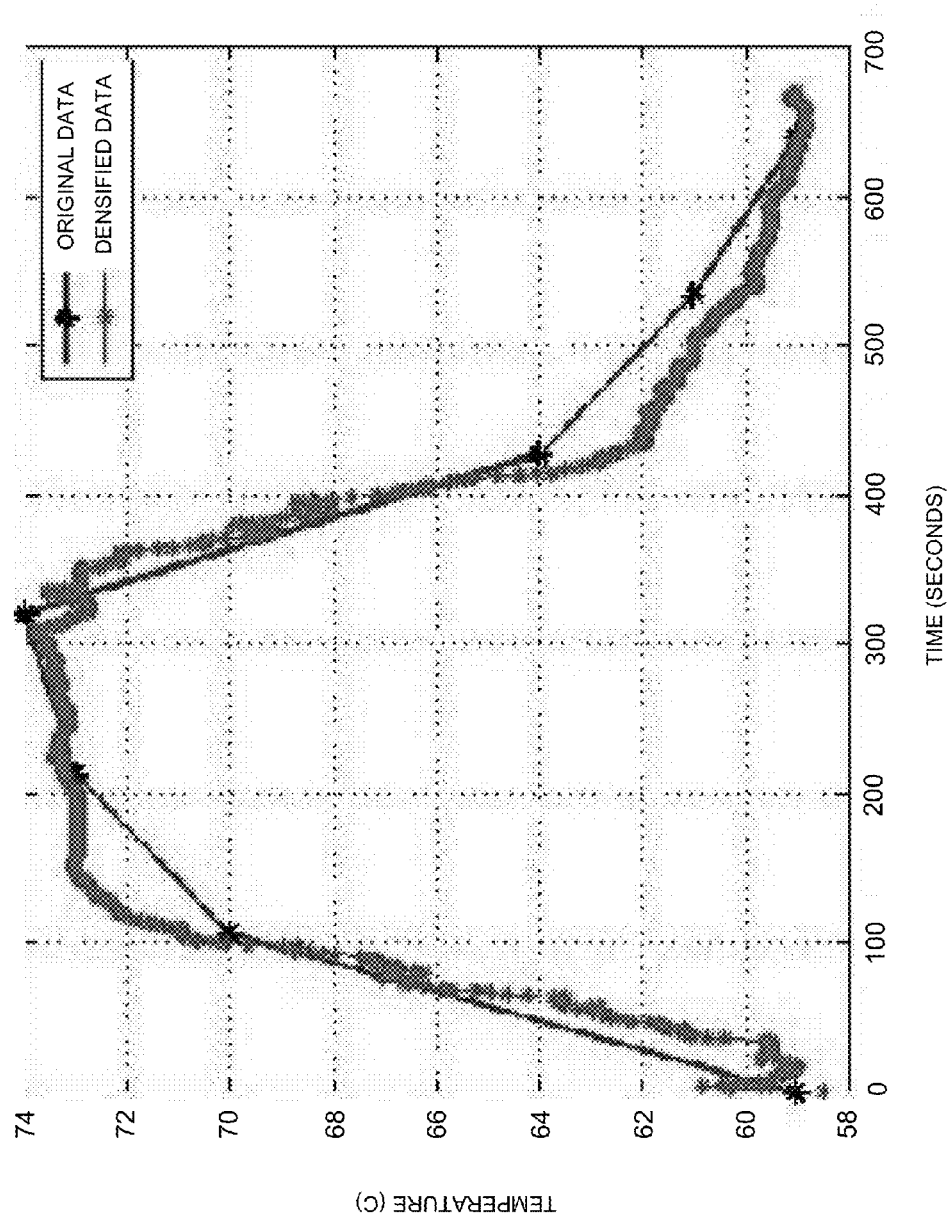
FIG. 9 illustrates densified telemetry data superimposed on non-densified telemetry data in accordance with the disclosed embodiments.

To further illustrate the densification process, FIG. 9 illustrates "densified" telemetry data superimposed on "original" raw, non-densified telemetry data in accordance with the disclosed embodiments. Note that the graph showing the original non-densified data misses many of the behavioral details illustrated by the graph showing the densified data.

Figure 10:
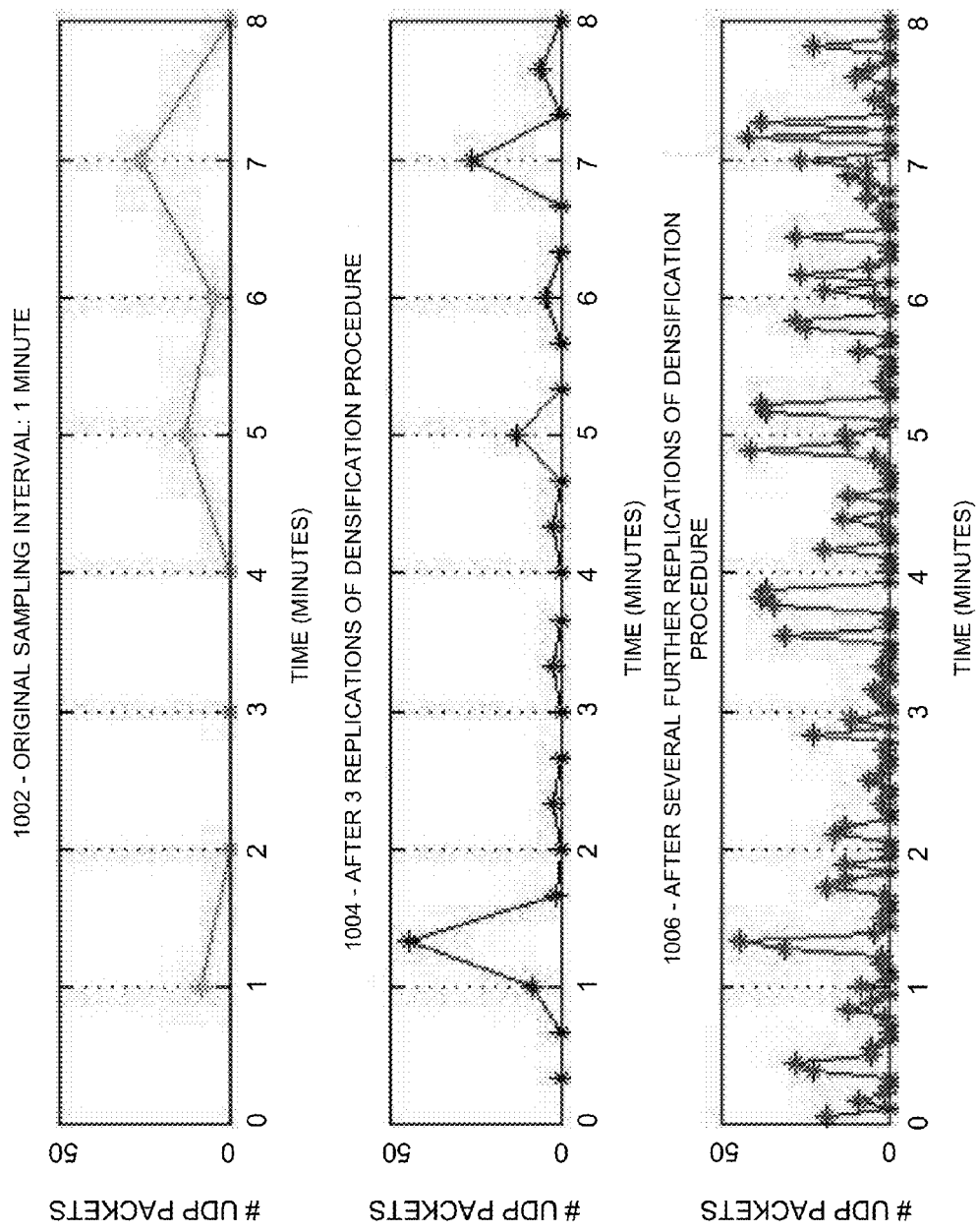
FIG. 10 illustrates how the densification process progresses in accordance with the disclosed embodiments.

FIG. 10 provides a further illustration of the densification process in accordance with the disclosed embodiments. The upper subplot 1002 in FIG. 10 shows a UDP packet count rate obtained from samples taken once per minute before application of the densification procedure. The middle subplot 1004 shows exactly the same UDP packet-count time series after three replications of the densification procedure. Comparing the slightly densified middle subplot 1004 with the original raw data upper subplot 1002 reveals additional dynamic behaviors that would have been missed with the original raw sampling rate of just once per minute. The lower subplot 1006 was obtained after 30 replications of the densification procedure. This lower subplot 1006 illustrates many more detailed dynamic patterns that can be used by advanced pattern-recognition techniques for prognostic cybersecurity and QoS prognostics.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for gathering telemetry data while testing a computer system, comprising:
    obtaining a test script that generates a load profile to exercise the computer system, wherein a running time of the test script is designed to be relatively prime in comparison to a sampling interval for telemetry data in the computer system;
    gathering telemetry data during multiple successive executions of the test script on the computer system;
    merging the telemetry data gathered during the multiple successive executions of the test script, wherein the relatively prime relationship between the running time of the test script and the sampling interval for the telemetry data causes a sampling point for the telemetry data to precess through different points in the test script during the multiple successive executions of the test script, thereby densifying sampled telemetry data points gathered for the test script; and
    outputting the densified telemetry data.

2. The method of claim 1, wherein merging the telemetry data gathered during the multiple successive executions of the test script includes:
    selecting telemetry data gathered during a first execution of the test script to be a reference profile; and
    for data gathered during each successive execution of the test script,
        sliding data points for the successive execution forward and/or backward in time to optimize a fit with the reference profile, and
        after optimizing the fit, merging the data points for the successive execution into the reference profile.

3. The method of claim 2, wherein after the data gathered during the multiple executions of the test script has been merged into the reference profile, the method further comprises performing a remerging operation that makes a second pass through the telemetry data gathered during each execution of the test script, and for each execution:
    removing the data gathered during the execution from the reference profile;
    re-optimizing the fit for the data gathered during the execution with the reference profile; and
    remerging the data gathered during the execution back into the reference profile.

4. The method of claim 3, wherein after performing the remerging operation, the method further comprises performing a timestamp conversion operation, wherein for each execution of the test script, the method converts timestamps for data points in the reference profile, which were obtained from the execution of the test script, into timestamps relative to a beginning of the execution of the test script.

5. The method of claim 4, wherein after converting the timestamps, the method further comprises performing a moving-window ensemble average operation for each parameter in the telemetry data over the reference profile.

6. The method of claim 5, wherein after performing the moving-window ensemble average operation, the method further comprises performing an iterative upsampling operation across data points in the reference profile to make time intervals between the data points uniform.

7. The method of claim 1, wherein the telemetry data includes:
  data gathered from physical sensors in the computer system that monitor physical performance parameters, including one or more of temperature, voltage, current, vibration, and acoustic parameters; and
  software-related telemetry parameters, including one or more of processor load, memory usage, cache usage, system throughput, queue lengths, I/O traffic, and quality of service (QOS).

8. The method of claim 1, wherein outputting the densified telemetry data comprises outputting the densified telemetry data to a predictive analytic system that is designed to detect incipient anomalies in performance of the computer system.

9. A non-transitory computer-readable storage medium storing instructions that when executed by a computer cause the computer to perform a method for gathering telemetry data while testing a computer system, the method comprising:
  obtaining a test script that generates a load profile to exercise the computer system, wherein a running time of the test script is designed to be relatively prime in comparison to a sampling interval for telemetry data in the computer system;
  gathering telemetry data during multiple successive executions of the test script on the computer system;
  merging the telemetry data gathered during the multiple successive executions of the test script, wherein the relatively prime relationship between the running time of the test script and the sampling interval for the telemetry data causes a sampling point for the telemetry data to precess through different points in the test script during the multiple successive executions of the test script, thereby densifying sampled telemetry data points gathered for the test script; and
  outputting the densified telemetry data.

10. The non-transitory computer-readable storage medium of claim 9, wherein merging the telemetry data gathered during the multiple successive executions of the test script includes:
  selecting telemetry data gathered during a first execution of the test script to be a reference profile; and
  for data gathered during each successive execution of the test script,
    sliding data points for the successive execution forward and/or backward in time to optimize a fit with the reference profile, and
    after optimizing the fit, merging the data points for the successive execution into the reference profile.

11. The non-transitory computer-readable storage medium of claim 10, wherein after the data gathered during the multiple executions of the test script has been merged into the reference profile, the method further comprises performing a remerging operation that makes a second pass through the telemetry data gathered during each execution of the test script, and for each execution:
  removing the data gathered during the execution from the reference profile;
  re-optimizing the fit for the data gathered during the execution with the reference profile; and
  remerging the data gathered during the execution back into the reference profile.

12. The non-transitory computer-readable storage medium of claim 11, wherein after performing the remerging operation, the method further comprises performing a timestamp conversion operation, wherein for each execution of the test script, the method converts timestamps for data points in the reference profile, which were obtained from the execution of the test script, into timestamps relative to a beginning of the execution of the test script.

13. The non-transitory computer-readable storage medium of claim 12, wherein after converting the timestamps, the method further comprises performing a moving-window ensemble average operation for each parameter in the telemetry data over the reference profile.

14. The non-transitory computer-readable storage medium of claim 13, wherein after performing the moving-window ensemble average operation, the method further comprises performing an iterative upsampling operation across data points in the reference profile to make time intervals between the data points uniform.

15. A system that gathers telemetry data while testing a computer system, comprising:
  a testing mechanism that tests the computer system, wherein during operation, the testing mechanism:
    obtains a test script that generates a load profile to exercise the computer system, wherein a running time of the test script is designed to be relatively prime in comparison to a sampling interval for telemetry data in the computer system;
    gathers telemetry data during multiple successive executions of the test script on the computer system;
    merges the telemetry data gathered during the multiple successive executions of the test script, wherein the relatively prime relationship between the running time of the test script and the sampling interval for the telemetry data causes a sampling point for the telemetry data to precess through different points in the test script during the multiple successive executions of the test script, thereby densifying sampled telemetry data points gathered for the test script; and
    outputs the densified telemetry data.

16. The system of claim 15, wherein while merging the telemetry data gathered during the multiple successive executions of the test script, the testing mechanism:
  selects telemetry data gathered during a first execution of the test script to be a reference profile; and
  for data gathered during each successive execution of the test script,
    slides data points for the successive execution forward and/or backward in time to optimize a fit with the reference profile, and
    after optimizing the fit, merges the data points for the successive execution into the reference profile.

17. The system of claim 16, wherein after the data gathered during the multiple executions of the test script has been merged into the reference profile, the testing mechanism performs a remerging operation that makes a second pass through the telemetry data gathered during each execution of the test script, and for each execution:

removes the data gathered during the execution from the reference profile;

re-optimizes the fit for the data gathered during the execution with the reference profile; and remerges the data gathered during the execution back into the reference profile.

18. The system of claim 17, wherein after performing the remerging operation, the testing mechanism performs a timestamp conversion operation, wherein for each execution of the test script, the testing mechanism converts timestamps for data points in the reference profile, which were obtained from the execution of the test script, into timestamps relative to a beginning of the execution of the test script.

19. The system of claim 18, wherein after converting the timestamps, the testing mechanism performs a moving-window ensemble average operation for each parameter in the telemetry data over the reference profile.

20. The system of claim 19, wherein after performing the moving-window ensemble average operation, the testing mechanism performs an iterative upsampling operation across data points in the reference profile to make time intervals between the data points uniform.

\* \* \* \* \*

UNITED STATES PATENT AND TRADEMARK OFFICE
CERTIFICATE OF CORRECTION

PATENT NO. : 9,929,922 B2
APPLICATION NO. : 15/180812
DATED : March 27, 2018
INVENTOR(S) : Gross et al.

Page 1 of 1

It is certified that error appears in the above-identified patent and that said Letters Patent is hereby corrected as shown below:

In the Specification

In Column 7, Line 19, delete "that that" and insert -- that --, therefor.

Signed and Sealed this
Fourth Day of September, 2018

Andrei Iancu
*Director of the United States Patent and Trademark Office*